United States Patent [19]

Inaba

[11] Patent Number: 5,259,659
[45] Date of Patent: Nov. 9, 1993

[54] OPENING/CLOSING APPARATUS OF CANVAS FOR LOAD TRANSPORT VEHICLE

[75] Inventor: Yoshisada Inaba, Osaka, Japan

[73] Assignee: Kabushiki Kaisha Shinsei, Osaka, Japan

[21] Appl. No.: 993,024

[22] Filed: Dec. 18, 1992

[30] Foreign Application Priority Data

Dec. 20, 1991 [JP] Japan ................... 3-355134

[51] Int. Cl.⁵ .............................. B60J 5/06
[52] U.S. Cl. ................... 296/181; 280/183; 280/143; 280/98
[58] Field of Search .............. 296/181, 183, 143, 98, 296/100

[56] References Cited

U.S. PATENT DOCUMENTS

| | | | |
|---|---|---|---|
| 2,346,554 | 4/1944 | Clark | 296/100 |
| 2,621,963 | 12/1952 | Harper | 296/143 |
| 5,044,689 | 9/1991 | Evers | 296/183 |
| 5,186,231 | 2/1993 | Lewis | 296/98 X |

FOREIGN PATENT DOCUMENTS 58-72162  5/1983  Japan .
454721  5/1992  Japan .

Primary Examiner—Robert R. Song
Attorney, Agent, or Firm—Sixbey, Friedman, Leedom & Ferguson

[57] ABSTRACT

An opening/closing apparatus of a canvas for a load transport vehicle is provided, which does not require a large working space. The apparatus has support posts raised at least at the front and tail ends of the rear body of the load transport vehicle and the canvas which covers the rear body by way of the support posts is lifted and lowered along the support posts, the apparatus including: a drum and has an outer diameter larger than that of drum; a wire which is taken up at one end thereof by the pulley and is connected at the other end of the lower portion of the rear body; a driver mechanism which is provided between said drum and the pulley, which causes the pulley to rotate integrally with the drum when the tension of the wire wound on the pulley is less than a predetermined value, and which causes the pulley to slide with respect to the drum when the tension is equal to or more than the predetermined value.

6 Claims, 9 Drawing Sheets

OPENING/CLOSING APPARATUS OF CANVAS FOR LOAD TRANSPORT VEHICLE

BACKGROUND OF THE INVENTION

1. Field of the Invention

The present invention relates to opening/closing apparatus of canvas for a load transport vehicle.

2. Description of the Related Art

The rear body of a load transport vehicle such as a truck is usually constructed such that canvas is attached to a frame which is raised on the rear body or such that a box-like frame for example of aluminum is mounted on the rear body. In the case where the canvas is attached to a frame, there are such disadvantages as that the canvas flutters when the vehicle is traveling and that such as rainwater enters the interior of the rear body. On the other hand, in the case of the box-like frame, only the tail end side of the rear body is designed to be capable of being opened/closed and loading/unloading operation is usually performed using the tail end side of the rear body. Loading/unloading operation from the tail end side of the rear body of a load transport vehicle requires a great amount of time and labor, since the width thereof is narrow while the depth is deep due to the fact that it is elongated in the front and rear direction thereof.

Thus, in recent years, seen among those having a box-like rear body structure are ones constructed such that the wall surfaces on right and left thereof may be opened in the so-called gull-wing configuration where substantially the center of the roof of the rear body is used as the supporting point. According to such construction, loading/unloading may be performed much more efficiently in comparison to the case where it is to be performed from the tail end side, since its rear body may be opened/closed at right and left side surfaces thereof.

SUMMARY OF THE INVENTION

In the opening/closing structure of the rear body of the so-called gull-wing configuration, however, an adequate space in the direction of right and left of the truck greater than the width of the truck is necessary to open/close the side walls thereof. Further, since the side walls are lifted higher than the roof of the truck in the state where they are fully opened, an adequate space is required also above the truck. However, there is not always a sufficient width and height provided at the place where loading/unloading operation is allowed, but rather, in many cases, such loading/unloading must be performed in a relatively limited space. In such a case, a problem occurs that the opening/closing structure of a gull-wing system cannot be used.

In view of the problems of the above prior art, it is an object of the present invention to provide an opening/closing apparatus of canvas for a load transport vehicle in which working efficiency of loading/unloading may be improved while at the same time securing a dependable protection wall against wind and rain for the load on the rear body of the vehicle and which does not require a large working space.

To this end, an opening/closing apparatus of canvas for a load transport vehicle is provided according to the present invention, which includes: support posts raised at least at the front portion and the rear portion of the rear body of the load transport vehicle where each post is formed into substantially an arch-like shape widthwise thereof; canvas extended between the support posts and lifted and lowered along the support posts, said canvas covering at least the side surface of the rear body when it is lowered; and a rotating drum extended between the support posts at a position toward the center in the direction of the width of the generally arch-shaped upper side portions of the support posts, said drum for performing winding and unwinding of the canvas; and wherein the side surfaces of the rear body as well as the surface toward the ends in the direction of the width of the upper surface of the rear body are opened when the canvas is taken up by the drum. Here, it is preferable that the rotating drum is urged toward the winding direction of the canvas and a driver means is provided for lowering the canvas against such urging force.

Further, in accordance with another aspect of the invention, an opening/closing apparatus of canvas for a load transport vehicle is provided, which includes: a pulley coaxial with the drum and having an outer diameter larger than that of the drum; a wire being taken up at one end thereof by the pulley and being connected at the other end thereof to the lower portion of the canvas after being turned at the lower portion of the rear body; a driver mechanism for driving said drum in a manner capable of being rotated forward and backward; and a friction transmission mechanism provided between the drum and the pulley, for causing the pulley to rotate integrally with the drum when the tension of the wire wound on the pulley is less than a predetermined value and for causing the pulley to slide with respect to the drum when said tension is equal to or more than the predetermined value.

In the above construction, it is preferable that the wire is turned at a pulley positioned at the lower portion of the rear body and such pulley is supported on the rear body in a manner capable of being moved in an up and down direction within a certain range and at the same time is continually urged downward.

Further, it is desirable that each support post is formed into generally an arch-like shape and the drum is positioned on the upper portion of the arch-like support post toward the center from the ends in the left and right direction thereof.

Since the drum for taking up the canvas is positioned on the upper portion of the support post at a position toward the center from the ends in the left and right direction thereof, upper portions toward left and right ends of the rear body are open when the awning is fully opened. Thus, even when a load is carried onto the rear body from a higher level for example by a forklift or a crane, the roof of the rear body does not stand in the way, thereby loading/unloading operation may be efficiently performed.

Further, according to another aspect of the invention, when the canvas is fully open, the driver mechanism may be rotated in the direction along which the canvas is closed, so that the wire connected to the lower end of the canvas is taken up by the pulley and at the same time the canvas having been taken up by the drum is unwound. Here, since the outer diameter of the pulley is larger than that of the drum, the wire is taken up by the pulley at a rate higher than that at which the canvas is unwound, thereby the canvas is unwound where it is highly tensed. When the tension acting upon the wire exceeds a certain value, slide is caused between the pulley and the drum by the friction transmission mechanism, so that the canvas is unwound from the drum where it is continually tensed to a certain degree and such as flexing of the canvas is eliminated even when the canvas is totally closed. Here, slacking of the wire itself is also prevented, since the wire is turned at a pulley positioned at the lower portion of the rear body and this pulley is urged downward.

DESCRIPTION OF THE PREFERRED EMBODIMENTS

The present invention will now be described by way of the specific embodiments as shown in the accompanying drawings.

Figure 1:
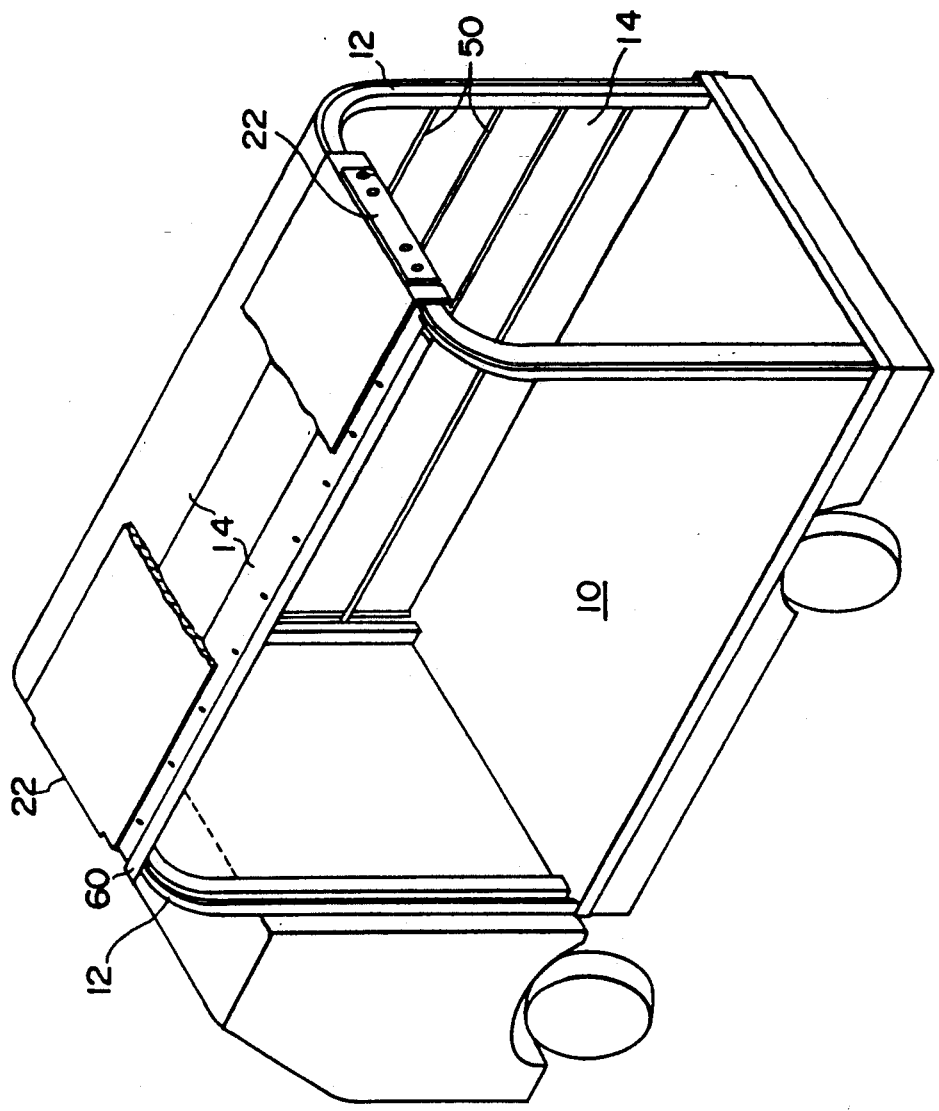
FIG. 1 is a perspective view showing the entire portion of an opening/closing apparatus of canvas for a load transport vehicle according to the present invention.

FIG. 1 shows a schematic perspective view of a truck to which an opening/closing apparatus of canvas for a load transport vehicle according to the present invention is applied. FIGS. 2 to 5 show a first embodiment of the present invention while FIGS. 6 to 10 show a second embodiment of the present invention. Support posts 12 of generally arch-like shape are raised respectively at the front end portion and the tail end portion of a rear body 10 of a truck, each support post 12 being smoothly curved at the upper corner portion thereof. In this embodiment, opening/closing apparatus for canvases 14 are provided symmetrically to each other at left and right wall portions of the rear body 10 of the truck. In FIG. 1, the left side canvas 14 is fully open and the right side canvas 14 is totally closed. Further, while the tail end surface of the rear body 10 of the truck is usually closed, it is here shown in its opened state.

Figure 2:
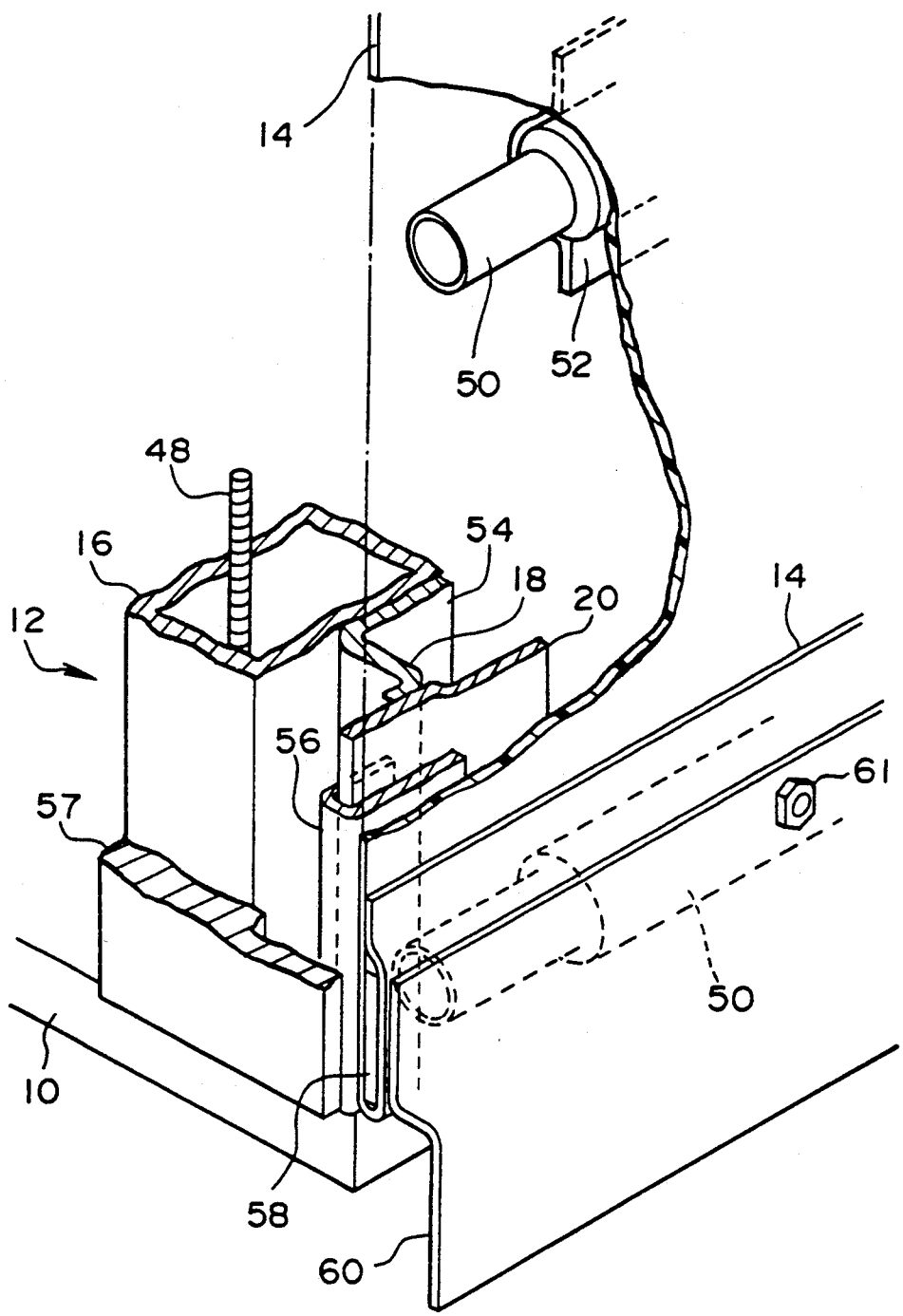
FIG. 2 is a partially fragmented perspective view showing the lower end portions of the support post and the canvas of a first embodiment of the present invention.
Figure 5:
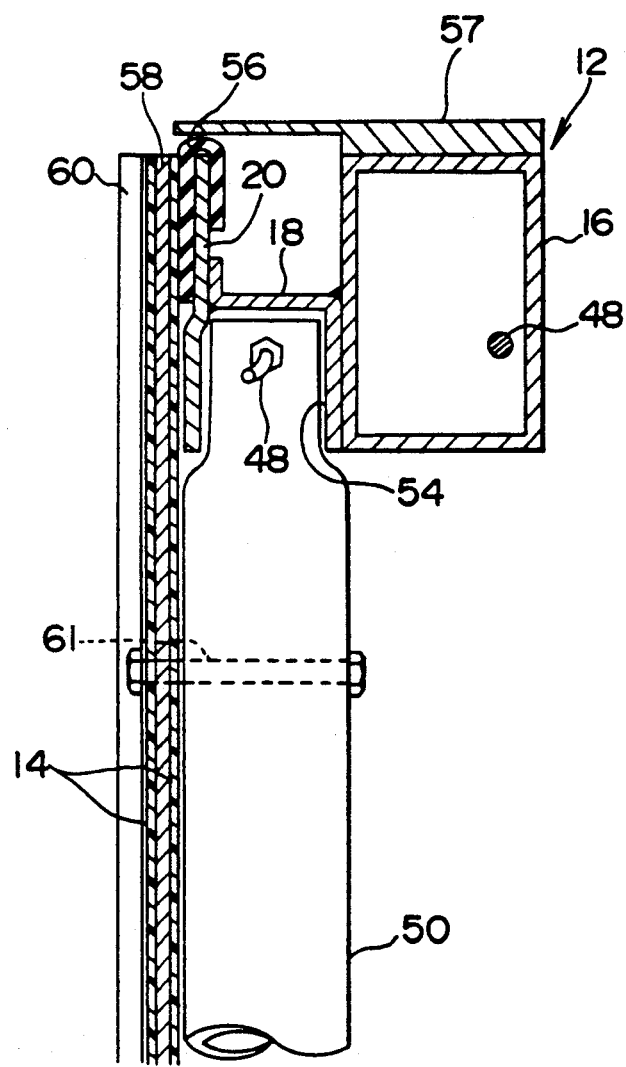
FIG. 5 is a sectional view taken along line V—V of FIG. 3.

In the first embodiment, as shown in FIGS. 2 and 5, each support post 12 includes a square column 16 having a rectangular cross section, a generally crank-shaped intermediate plate 18 extended vertically from the square pillar 16, and a guide plate 20 welded to an end of the intermediate plate 18. The support post 12 is curved at its upper end portion to be extended toward the center, thereby being connected to a retaining plate 22 which retains such as a driver mechanism to be described later. That is, each support post 12 at the front and rear ends is extended to left and right symmetrically with respect to the retaining plate 22.

Figure 3:
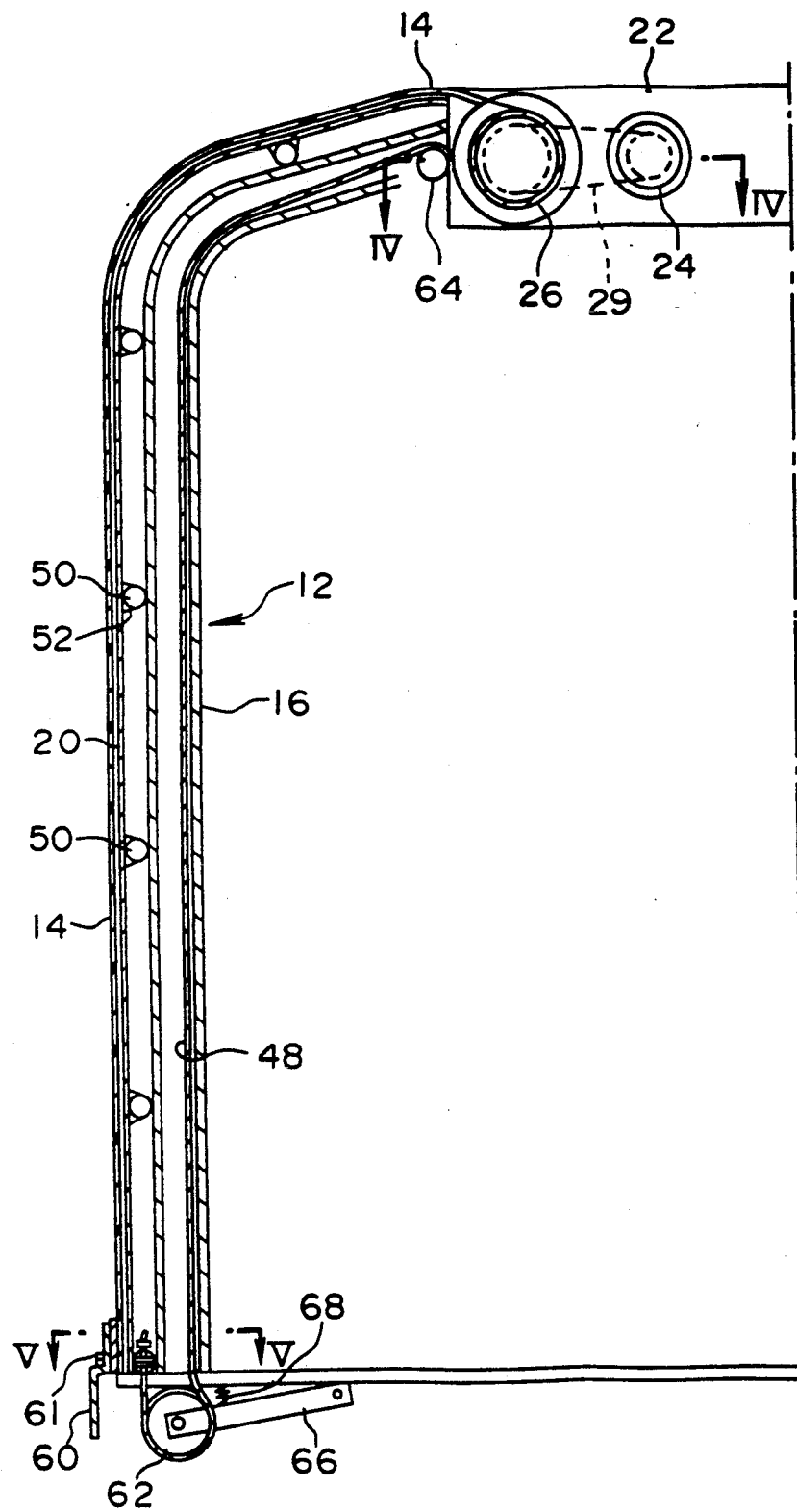
FIG. 3 is a sectional view showing the structure of the support post of the same embodiment.
Figure 4:
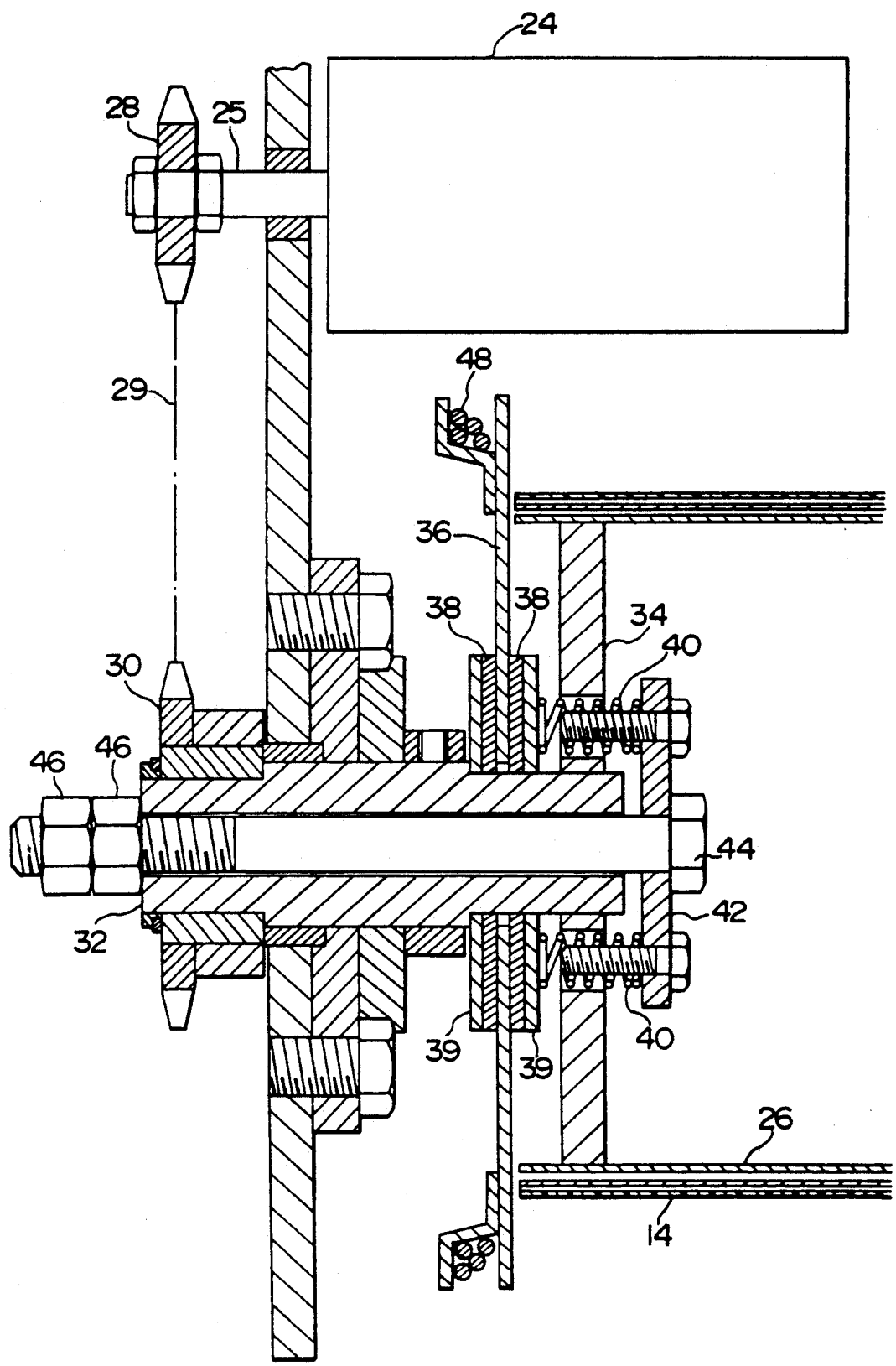
FIG. 4 is a sectional view taken along line IV—IV of FIG. 3.

The retaining plate 22 retains, as shown in FIG. 3, motors 24 and drums 26 for the left and right side support posts 12, respectively, symmetrically with respect to the center of the retaining plate. Of these, the structure of the motor and the drum on one side is shown in detail in FIG. 4. In particular, a pulley 28 is mounted on the end a rotation shaft 25 of the motor 24, and the rotating power of the pulley 28 is transmitted via a chain 29 to a pulley 30 for the drum 26. The rotation of the pulley 30 is transmitted as it is to a drum shaft 32 and the drum shaft 32 is inserted at its base end portion into an end plate 34 of the drum 26. The base end of the drum shaft 32 is formed into the shape of a square column and the end plate 34 into which this is inserted is formed into a complementary shape to this, thereby the rotation of the drum shaft 32 is transmitted as it is to the end plate 34. It should be noted that the drum 26 is mounted on the outer periphery of the end plate 34.

Pulley 36 for a wire to be described later is loosely fitted onto the outer periphery toward the base end of the drum shaft 32, the pulley 36 being clamped by a pair of friction plates 38, 38 from the both sides thereof. The pair of friction plates 38 are clamped by support plates 39, 39 from the outer side thereof, one of these abutting the stepped portion of the drum shaft 32 and the other receiving two coil springs 40. Since the friction plate 38 and the support plate 39 are fitted onto the square column portion of the drum shaft 32, they are rotated always integrally with the drum shaft. Each coil spring 40 passes through the end plate 34 and is further extended toward the base end to abut a pressing plate 42. A long size bolt 44 passes through the center of the pressing plate 42 and the bolt 44 is extended to the outside through the center of the drum shaft 32 where adjusting nuts 46 are threaded. That is, by tightening and loosening the adjusting nuts 46, the pressing force of the coil springs 40 against the friction plate 38 may be changed through the pressing plate 42. The pulley 36 is rotated integrally with the drum shaft 32 as well as with the drum 26 when the clamping force of the pair of friction plates 38 over the pulley 36 is sufficiently large, while, when the clamping force thereof is small, the pulley 36 is caused to slide and does not rotate integrally with the drum 26.

In this construction, the pulley 36 is formed to have a larger diameter than the drum 26. Further, an end of the canvas 14 is taken up by the drum 26 and a wire 48 is taken up by the pulley 36.

When the canvas 14 is totally closed, the canvas 14 is, as shown in FIG. 3, extended outward from the drum 26 and reaches the lower end of the above described support post 12 along the support post 12. A plurality of frame pillars 50 extended in the front and rear direction of the rear body are disposed in the course of the canvas at regular intervals in the up and down direction, i.e., in the direction along which the canvas is lifted and lowered. The frame pillars 50 are fixed to the canvas 14 as they are inserted into bag portions 52 formed at regular intervals on the inside surface of the canvas 14 so as to reinforce the strength of the canvas 14 when the awning is totally closed. As shown in FIG. 5, the both ends of each frame pillar 50 are formed to have relatively smaller diameter comparing to the other portions and are inserted into a concave 54 formed by the guide plate 20 and the intermediate plate 18 of each support post 12, thereby the canvas 14 is lifted/lowered along the support post 12. It should be noted that the outer surface of the portions other than the two ends of the framing pillar 50 is constructed to be on substantially the same plane as the outer surface of the guide plate 20. Further, seal member 56 having a U-shaped cross section is welded to front and rear end edges of the canvas 14 along the entire length in the up and down direction thereof and the seal member 56 is attached so that it holds the outer side end portion of the guide plate 20 of the support post 12. It is thus lifted/lowered along the guide plate 20. Further, the end edge of the seal member 56 is covered with a cover 57 and the cover 57 is fixed to a square pillar 12. Even if such as rain enters from the front and rear direction of the support post 12, the passage to the inside of the canvas 14 is formed into a complicated maze-like configuration by the cover 57 and the seal member 56 to thereby prevent entering of water or the like. To the lower end portion of the canvas 14, a reinforcing plate 58 is attached, which has a predetermined width and has substantially the same length as the canvas 14 in the front and the rear direction thereof. The reinforcing plate 58 is attached thereto such that the lower end portion of the canvas 14 is turned up and the turned up end portion is fused into the surface of the canvas 14 to form a bag and it is inserted into this bag. Further, a skirt member 60 formed such as of rubber is attached to the outside of the lower end portion thereof. When the canvas 14 is totally closed, the skirt member 60 is extended to be terminated at a level lower than the upper surface of the deck 10, thereby preventing entering of water from the side surface.

To prevent the seal member 56 from projecting outward due to its thickness, the guide plate 20 is deviated outward at its inner side (lower side as shown in FIG. 5). As a result, the outer surfaces of the seal member 56, guide plate 20 and the frame pillar 50 are on substantially the same plane. Thereby, it is possible to secure the canvas 14 in the state where no irregularity exists in the front and rear direction thereof. Further, the ends in the front and rear direction of the frame pillar 50 are not in close proximity with the canvas 14 and the guide plate 20 of the support post 12 is in such a state that it is sandwiched between the two members.

The frame pillar 50 at the lowermost portion of the canvas 14, with the exception of the end portions in the front and rear direction thereof, is formed integrally with the skirt member 60 and the reinforcing plate 58 as well as with the canvas 14 itself by bolts 61 which are attached at predetermined intervals in the front and rear direction. The other end of the wire 48 which has been wound on the pulley 36 is fixed to the end portion of the lowermost frame pillar 50. The wire 48 passes through the floor of the deck 10 from the lowermost frame pillar 50 and is further extended downward. It is then extended upward after turning at a pulley 62 as shown in FIG. 3 and extended upward through the interior of the square pillar 16 of the support post 12 and is taken up by the above described pulley 36 via another pulley 64 which is disposed at the upper end of the support post 12. The pulley 62 provided below the floor of the deck is supported on the deck via an arm 66 in a manner capable of being oscillated and some midway point of the arm 66 is urged downward by a spring 68. That is, even if a slack is caused to occur in the wire 48, the occurrence of such slack is prevented by the pulley 62 which is urged downward.

The operation of the embodiment having the above described construction will now be described. First, in the case where the canvas 14 is to be closed from the fully opened state of the canvas 14 as shown by the left side wall portion of FIG. 1, the motor 24 is driven in the closing direction. Thereby the rotating power of the motor is transmitted to the drum 26 via the pulleys 28, 30. At the same time, by the pressing force of the previously set coil spring 40, the pulley 36 is clamped by a sufficiently large force via the friction plate 38 so that the pulley 36 is also rotated together with the support plate 39 and the friction plate 38 which are rotated integrally with the drum shaft 32. Thereby the wire 48 is taken up by the pulley 36 and at the same time the canvas 14 is unwound from the drum 26.

Here, since the outer diameter of the pulley 36 is formed to be larger than the outer diameter of the drum 26, the taking up speed of the wire 48 is higher than the unwinding speed of the canvas 14 by the drum 26. The canvas 14 is thus unwound while it is continually pulled with a predetermined force by the wire 48, preventing such as slacking of the canvas 14 especially in its totally closed state. A large tension occurs in the wire 48 when the taking up speed of the wire 48 is too high comparing to the unwinding speed of the canvas 14. If such tension exceeds the clamping force on the pulley 36 by the pair of friction plates 38 given by the above described coil spring 40, the pulley 36 is caused to slide with respect to the friction plate, i.e., with respect to the drum shaft 32 so that an excessive tension does no act upon such as the wire 48.

Since, in this manner, the canvas 14 is continually in its tensed state and does not cause a slack even when the awning is totally closed, the strength thereof is high. Further, in this embodiment, the frame pillars 50 are disposed at suitable intervals on the canvas and the front and rear end portions of these frame pillars are inserted into the concave 54 of the support post 12. In addition, the canvas is constructed to be held on the guide plate 20 of the support post 12 via the seal member 56 at the front and rear ends thereof. Thereby its strength is greatly improved. It is thus possible to sufficiently withstand even the occurrence of collapsing or the like of the load within the rear body. Fluttering or the like of the canvas under the condition of strong wind may also be prevented.

In such awning structure, in addition to the problem of strength, entering of rainwater or the like is also an important problem to be solved. According to this embodiment, since the portion toward the side of the lower end is sealed by the skirt member 60 while the end portions in the front and rear direction are sealed by the cover 57 and seal member 56, entering of water into the rear body may be securely prevented. Specifically, it has been unable to provide a secure protection against entering of rainwater when the transport vehicle is traveling at a high speed, since the inside space covered with the canvas becomes of a negative pressure and thereby tends to actively suck rainwater or the like together with air into the awning. Such problem may also be solved by the above construction.

When the awning is to be opened from its totally closed state, the motor 24 is rotated reversely. Thereby, the canvas 14 is lifted along the support post 12 as it is taken up by the drum 26 to open the side of the rear body. At this time, since as described the pulley 36 is formed to have a larger diameter than the drum 26, there is a possibility of a flexure of the wire 48 as the unwinding speed of the wire 48 exceeds the taking up speed of the canvas 14. Since, however, the pulley 62 below the deck is urged downward by the spring 68, such flexure of the wire 48 may be absorbed by the downward oscillation of the pulley 62.

Furthermore, according to the above embodiment, the take-up drums 26 for canvas are not provided at positions above the left and right ends of the rear body 10, but they are provided at deeper positions far back toward the center thereof. For this reason, in the fully-opened state of the awning as shown in FIG. 1, the upper portions at the left and right ends of the rear body are open. It is thus possible to use the space above the left and right ends of the truck at the time of loading-/unloading operation. For example, a load may be loaded onto the deck 10 by simply lowering it from a position above the truck. There is an advantage that loading/unloading operation is greatly facilitated.

It should be noted that, while in the above embodiment an example has been shown where the opening/closing apparatus is used at the side surfaces of the transport vehicle, the present invention is not necessarily limited to this and such opening/closing apparatus may naturally be used also at the rear surface of a transport vehicle.

A second embodiment of the present invention will now be described with reference to FIGS. 6 to 10. In the followings, identical or corresponding portions as those in the first embodiment will be denoted by the same reference numerals and a detailed description thereof will be omitted.

In general, the second embodiment differs from the first embodiment in such points as that the rotating drum 26 is urged toward its taking up direction by a spring 72 and the lower end of the canvas is connected to a chain 74 extended along the support post 12 so that the canvas may be unwound against the urging force of the spring of the drum 26 by driving the chain by means of a motor. Specifically, a pair of left and right support posts 12, 12 are connected to each other via a retaining plate 22 to form generally an arch at each of the front portion and the tail end portion of the rear body. The rotating drum 26 is rotatably attached to the retaining plate 22 at a position toward the center of the upper side portion of the arch-like shape, a drum shaft 70 passes through the center position of the rotating drum 26. The two ends of the drum shaft 70 are fixed to the retaining plate 22 and the drum 26 is supported via an end plate 34 thereof in a manner rotatable with respect to the drum shaft 70. A pair of end plates 34 is provided at each of the front portion and the rear portion, and the coil springs 72 are placed between the respective pair of the end plates 34, the coil spring 72 being fixed at one end thereof to the drum shaft 70 and at the other end thereof to the end plate 34, i.e., the side of the drum 26. Thereby, a torsion occurs on the coil spring 72 as the canvas 14 wound on the drum 26 is unwound to rotate the drum 26. As a result, the drum 26 is urged toward the taking up direction of the canvas by the restoring force of the spring 72.

Figure 6:
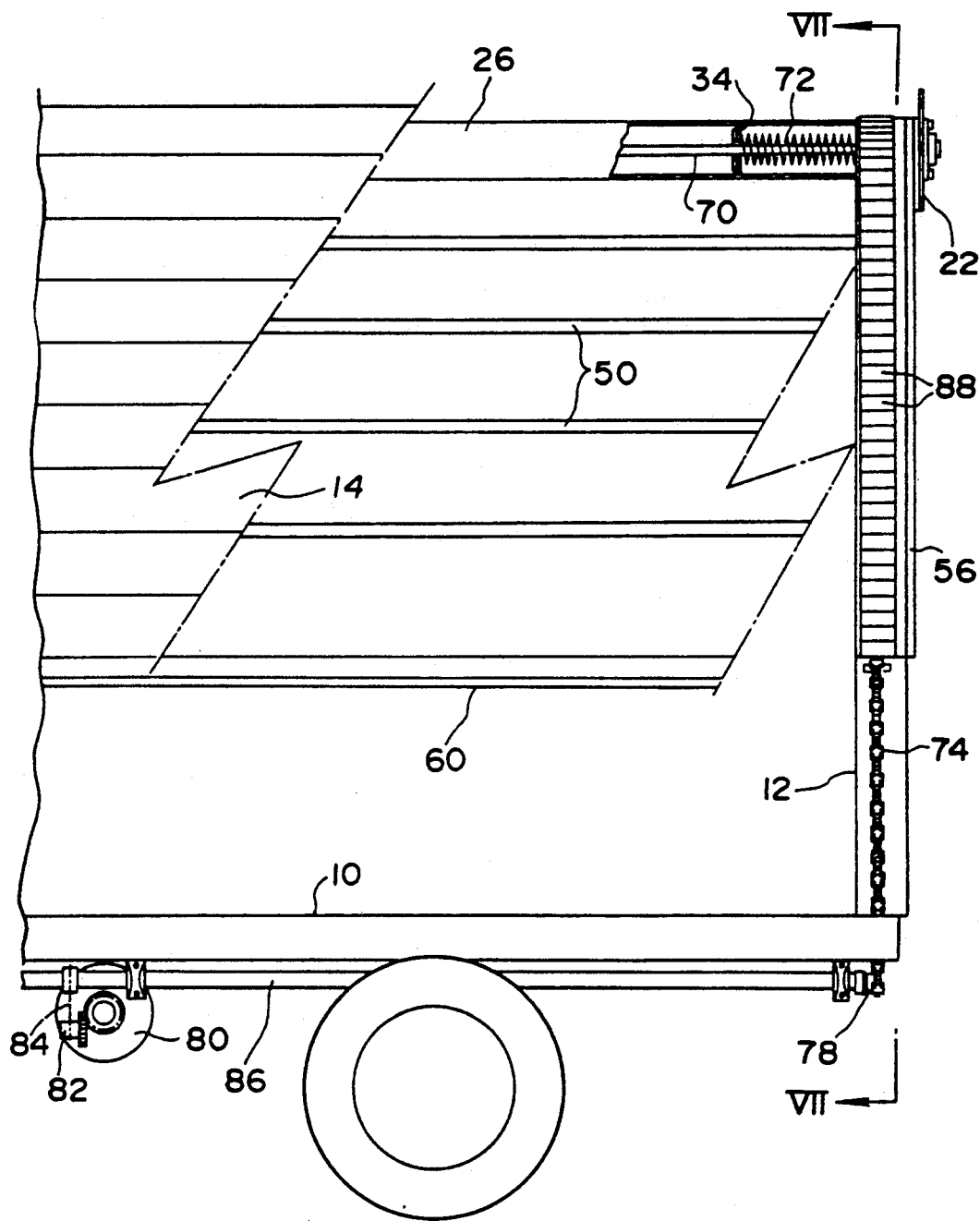
FIG. 6 is a partially fragmented side view showing the opening/closing apparatus at the tail end side of a second embodiment of the present invention.
Figure 7:
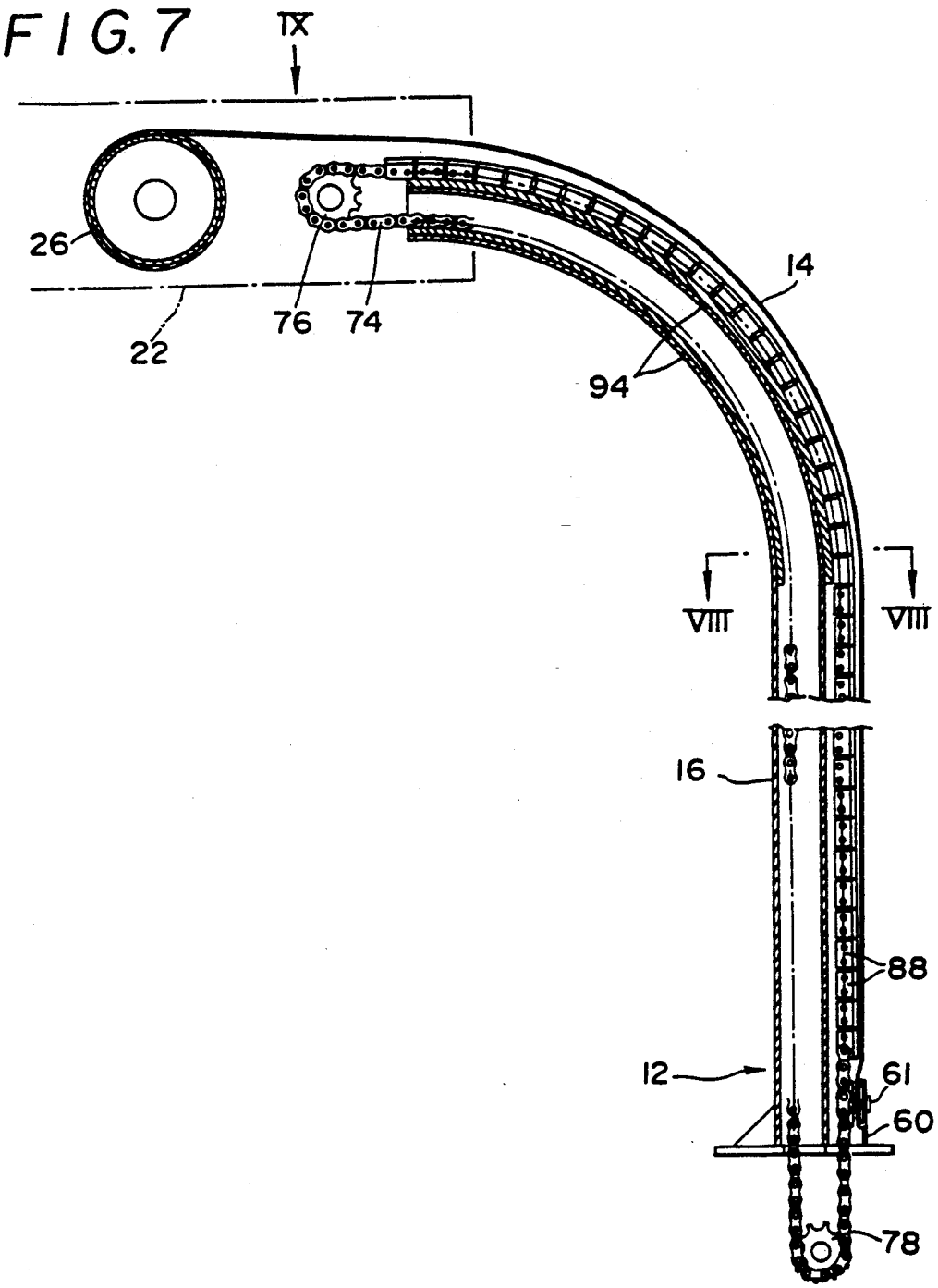
FIG. 7 is a sectional view taken along line VII—VII of FIG. 6.

Denoted by numeral 74 is a chain. The chain 74 is disposed such that: it is wound on a first sprocket 76 which is supported on the retaining plate 22; one side thereof is extended along the outer wall of a square pillar 16 of each support post 12 and passes through the floor of the deck 10 to be wound on a second sprocket 78 which is positioned below the deck 10; and then it reaches the first sprocket 76 through the interior of the square pillar 16. Referring to FIG. 7 which shows the totally closed state of the canvas 14 where it is lowered to the lowermost end, the lower end portion of the canvas 14 is connected via bolt 16 to the chain 72. A motor 80 which is the driving source of the chain 74 is, as shown in FIG. 6, fixed to the reverse of the deck 10 and its output shaft 82 is connected via another chain 84 to a transmission shaft 86 which is extended in the front and rear direction of the rear body so as to rotate the same. The above described second sprocket 78 is mounted on an end portion of the transmission shaft 86. While FIG. 6 shows only the driving mechanism at the tail end side of the rear body, the driving mechanism at the front portion side thereof is also driven in a similar manner by way of the transmission shaft 86.

Figure 10:
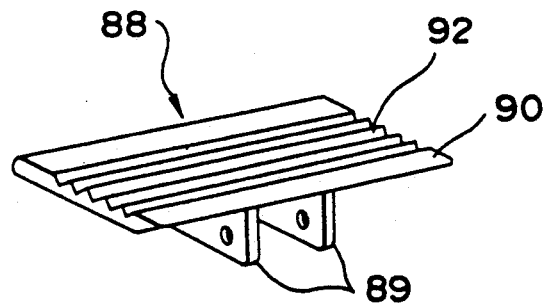
FIG. 10 is an enlarged perspective view of the friction member of the same embodiment.

While the front and rear end portions of the canvas 14 when it is totally closed are extended as shown in FIG. 7 along the outer surface of the chain 74, a plurality of friction members 88 are provided in a manner continuously mounted on the chain 74 at the contacting positions of the chain 74 with the canvas 14. As shown in FIG. 10, each friction member 88 is formed of a pair of legs 89 which clamp the chain 74 from the two sides thereof and a flat plate portion 90, and a corrugate portion 92 for increasing the friction with the canvas 14 is formed on the upper surface of the flat plate 90. By placing the friction members 88 in this manner at portions where the canvas 14 contacts the chain, especially when the canvas 14 is taken up by the drum 26, the entire portion of the canvas is smoothly sent toward the drum 26 to secure the winding up operation thereof. That is, since the canvas 14 is connected to the chain 74 only at its lower end, only the lower end of the canvas is actively sent upward together with the chain 74 when the canvas is taken up. Thus, while the canvas 14 may not be smoothly taken up to the drum 26 to cause a slack thereof when for example an interference occurs at some midway point of the canvas, the midway portions of the canvas 14 are also sent smoothly toward the drum due to the presence the friction members 88 to make smooth the winding up operation. Further, the front and rear side edges of the canvas 14 at the time of its unwinding are reinforced by the friction members 88 to prevent fluttering or the like of the canvas.

Figure 8:
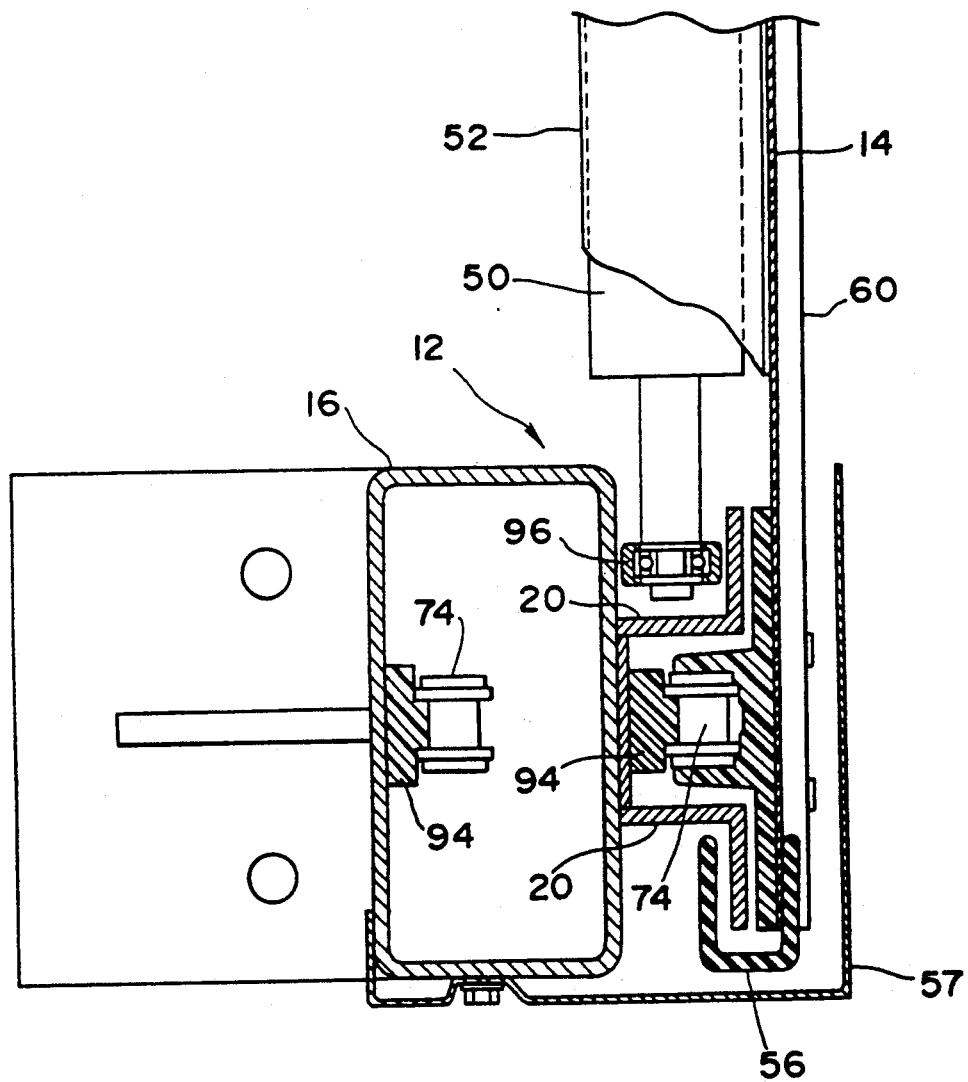
FIG. 8 is an enlarged sectional view taken along line VIII—VIII of FIG. 7.

It should be noted that, in FIG. 8, reference numeral 94 denotes a slide rail for causing the chain 74 to smoothly run through the curved portion of the support post 12 and numeral 96 denotes a bearing provided at the shaft end portion projecting at the two ends of the frame pillar 50. In this embodiment, a pair of guide plates 20 are extended from the outer side surface of the square pillar 16 and each guide plate 20 is formed to be bent outward in an L-shape, a guide passage for the bearing 96 is formed by one of the guide plates 20. Further, in this embodiment, the seal member 56 is extended from the side edge of the canvas 14 to be curved into a U-shape and is positioned so as to be inserted into a groove which is formed by the other guide plate 20.

Figure 9:
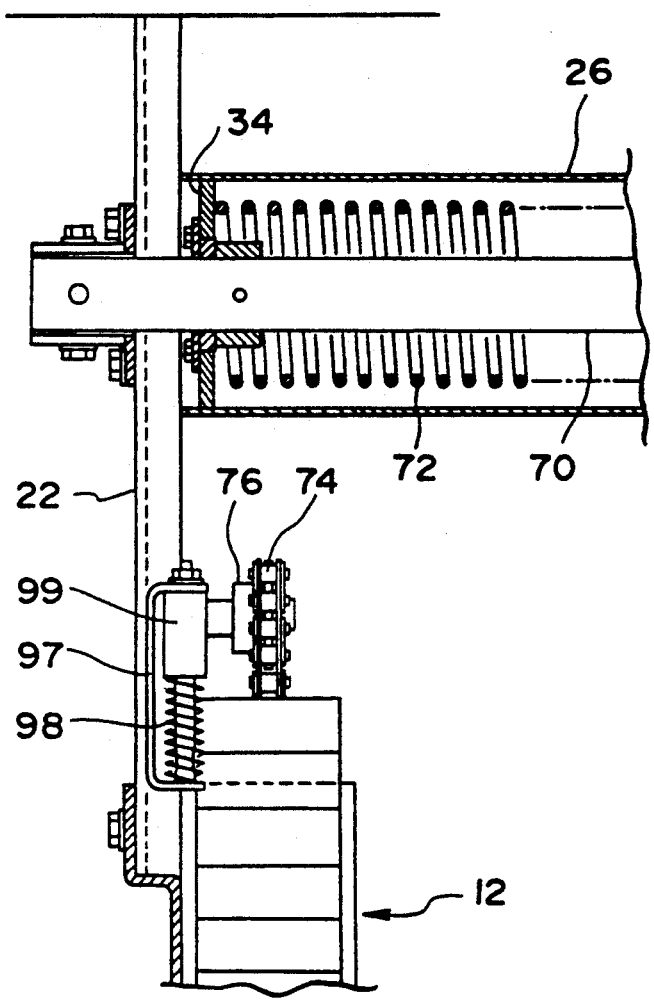
FIG. 9 is a view as seen along line IX of FIG. 7.

As shown in FIG. 9, a first sprocket 76 for the chain 74 is not directly fixed to the retaining plate 22, but it is journalized in a rotatable manner into a support member 99 which is moveably supported via a coil spring 98 to a frame 97 fixed to the retaining plate 22. Thereby a slack of the chain 74 is prevented.

According to the second embodiment constructed as described, when the second sprocket 78 is driven to be rotated clockwise as shown in FIG. 7 by the motor 80 from the fully opened state of the awning, the canvas 14 fixed to a portion of the chain 74 is unwound against the urging force of the spring 72 of the drum 26. Since, at this time, the canvas 14 is urged by the urging force of the spring 72 toward the direction along which it is taken up by the drum 26, the canvas 14 is continually in the state where it is tensed. Thus such as the fluttering of the canvas 14 due to wind or the like may be prevented. When the second sprocket 78 is rotated counterclockwise as shown in FIG. 7 from the totally closed state of the awning, the lower end portion of the canvas 14 is moved upward together with the chain 74 and, thus, the canvas 14 is wound by the urging force given to the drum 26 by the spring 72. Since, at this time, the friction members 88 are caused to travel with the chain 74 especially along the curved portion, the midway portions of the canvas 14 are also smoothly sent toward the drum together with the chain 74 so that the canvas 14 is smoothly taken up by the drum 26.

As has been described, according to the present invention, loading/unloading task may be performed by a very simple operation even when a large space is not provided widthwise of and above the transport vehicle. There is thus an excellent advantage that a great reduction may be achieved of time and labor for loading/unloading operation. Further, despite the fact that canvas is used, the canvas may be shut while it is continually in the state of being tensed. Thus it is also possible to provide a strength which is sufficient as a protection wall.

In addition, according to the present invention, since the support posts are formed into generally an arch and the take-up drums for the canvas are positioned toward the center from the left and right ends, the space above the transport vehicle may be used in loading/unloading. Thus, there is an advantage that it is possible to achieve a further simplification of loading/unloading work.

What is claimed is:

1. An opening/closing apparatus of canvas for a load transport vehicle, comprising:
   support posts raised at least at front portion and at rear portion of the rear body of the transport vehicle, each post forming an arch-like shape widthwise thereof;
   canvas extended between the posts and lifted and lowered along the posts, said canvas covering at least the side surface of the rear body; and
   a rotating drum for winding and unwinding the canvas, said drum extended between the support posts at a position toward the widthwise center of the upper-side portion of the arch-like shape of the support posts; and
   wherein side surface of the rear body as well as the surface toward the widthwise ends of the upper surface of the rear body are opened when the canvas is taken up by the drum.

2. An opening/closing apparatus of canvas for a load transport vehicle according to claim 1, further comprising:
   urging means for urging the rotating drum toward the direction along which the canvas is taken up; and
   driver means connected to the lower end of the canvas, for lowering the canvas against the urging force of the urging means of the drum; and
   wherein the canvas is continually tensed by the urging force of said urging means when the canvas is unwound from the rotating drum.

3. An opening/closing apparatus of canvas for a load transport vehicle according to claim 2, wherein the urging means comprises a spring connected at one end thereof to
   the rotating drum and connected at the other end thereof to the support post; and
   wherein the driver means comprises: a motor; and a winding transmission mechanism lifted and lowered along the support post upon switching of the drive of the motor and connected to the lower end of the canvas.

4. An opening/closing apparatus of canvas for a load transport vehicle having support posts raised at least at a front portion and a tail end portion of the rear body of the load transport vehicle and canvas covering the rear body by way of the support posts and lifted and lowered along the support post, said opening/closing apparatus of canvas for a load transport vehicle comprising:
   a drum for taking up the canvas, extended between the support post at the front portion and the support post at the tail end portion;
   a pulley coaxial to the drum and having an outer diameter larger than that of the drum;
   a wire taken up at one end thereof by the pulley and connected at the other end to the lower portion of the canvas after turned at the lower portion of the rear body;
   a driver mechanism capable of driving said drum to rotate forward and backward; and
   a friction transmission mechanism provided between said drum and the pulley, said friction transmission mechanism causing said pulley to rotate integrally with the drum when the tension of the wire wound on the pulley is less than a predetermined value, said friction transmission mechanism causing said pulley to slide with respect to the drum when said tension is equal to or more than the predetermined value.

5. An opening/closing apparatus of canvas for a load transport vehicle according to claim 4, wherein the wire is turned at a pulley positioned at the lower portion of the rear body and the pulley is supported on the rear body moveably in an up and down direction within a certain range and is continually urged downward.

6. An opening/closing apparatus of canvas for a load transport vehicle according to claim 4, wherein each support post is formed into generally an arch-like shape and said drum is positioned toward the center from the left and right ends on the upper side portion of the arch-shaped post.

* * * * *